United States Patent
Zhu

(10) Patent No.: US 12,469,489 B2
(45) Date of Patent: Nov. 11, 2025

(54) VOICE INTERACTION METHOD AND APPARATUS

(71) Applicant: Nanjing Horizon Robotics Technology Co., Ltd., Nanjing (CN)

(72) Inventor: Changbao Zhu, Nanjing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 264 days.

(21) Appl. No.: 18/348,841

(22) Filed: Jul. 7, 2023

(65) Prior Publication Data

US 2024/0021194 A1    Jan. 18, 2024

(30) Foreign Application Priority Data

Jul. 15, 2022 (CN) .......................... 202210837475.0

(51) Int. Cl.
*G10L 15/18* (2013.01)
*G10L 15/22* (2006.01)

(52) U.S. Cl.
CPC ...... *G10L 15/1815* (2013.01); *G10L 15/1822* (2013.01); *G10L 15/22* (2013.01); *G10L 2015/223* (2013.01)

(58) Field of Classification Search
CPC . G10L 15/1815; G10L 15/1822; G10L 15/22; G10L 2015/223; G10L 15/32; G10L 2015/225; G06F 3/167
See application file for complete search history.

(56) References Cited

U.S. PATENT DOCUMENTS

2020/0349940 A1* 11/2020 Ko .................. G10L 15/187
2023/0126305 A1*  4/2023 Kim ................ G10L 15/22
                                                    704/275

FOREIGN PATENT DOCUMENTS

| CN | 109473110 A |   | 3/2019 |
| CN | 110322878 A |   | 10/2019 |
| CN | 111276140 A |   | 6/2020 |
| CN | 111583928 A | * | 8/2020 |
| CN | 113990312 A | * | 1/2022 |
| CN | 114387965 A | * | 4/2022 |
| CN | 115249477 A | * | 10/2022 |
| WO | 2019007245 A1 |   | 1/2019 |

OTHER PUBLICATIONS

First Chinese Office action and Search Report from corresponding Chinese Patent Application No. 2022108374750 mailed on Mar. 14, 2025, along with English translation.

* cited by examiner

*Primary Examiner* — Abul K Azad
(74) *Attorney, Agent, or Firm* — K&L Gates LLP

(57) ABSTRACT

This disclosure provides a voice interaction method and apparatus. At least one target device is determined from various electronic devices by receiving a wakeup signal sent by at least one wakeup device in the various electronic devices in response to a voice instruction of a user. Each target device is instructed to recognize a semantic meaning of the voice instruction to obtain semantic information, so as to determine a first response device in the various target devices based on the semantic information. In this case, the first response device is enabled to respond to the voice instruction. In this way, a problem that it is difficult for a plurality of devices to interact with the user accurately is resolved, thereby facilitating user experience.

14 Claims, 4 Drawing Sheets

VOICE INTERACTION METHOD AND APPARATUS

RELATED APPLICATION INFORMATION

This application claims priority to Chinese patent application No. 202210837475.0 filed on Jul. 15, 2022, incorporated herein by reference.

FIELD OF THE INVENTION

This disclosure relates to the technical field of multi-device interaction, and in particular, a voice interaction method and apparatus.

BACKGROUND OF THE INVENTION

With technological breakthroughs in the field of artificial intelligence, voice devices that can interact with users through voice, such as smart speakers, smartphones, and smart vehicle-mounted displays, have greatly facilitated daily lives of people. The user can wake up a corresponding voice device by using a preset wakeup keyword to interact with the awakened voice device.

However, when there are a plurality of voice devices in a use environment and wakeup keywords for the plurality of voice devices are consistent, the plurality of voice devices may interact with the user at the same time. As a result, the voice devices interfere with each other and generate a lot of noise, which affects normal voice interaction and may even cause the voice devices to respond incorrectly. In view of the above, how to accurately perform voice interaction in a use scenario with a plurality of voice devices is a problem to be resolved urgently.

SUMMARY OF THE INVENTION

Embodiments of this disclosure provide a voice interaction method and apparatus, to resolve a problem in the prior art that a plurality of voice devices cannot interact with a user accurately, which is not conducive to user experience. Specifically, the following technical solutions are provided in the embodiments of this disclosure.

According to a first aspect of this disclose, a voice interaction method is provided, including:
- receiving a wakeup signal sent by at least one wakeup device in a plurality of electronic devices, wherein the wakeup signal is sent after the wakeup device collects a voice instruction of a user;
- in response to the wakeup signal, determining at least one target device from the plurality of electronic devices;
- sending a voice recognition instruction to each target device, wherein the voice recognition instruction is used to instruct each target device to recognize a semantic meaning of the voice instruction to obtain semantic information, and send the semantic information to a decision center;
- determining a first response device in the at least one target device based on the semantic information; and
- sending a first response instruction to the first response device, wherein the first response instruction is used to instruct the first response device to respond to the voice instruction.

According to a second aspect of this disclose, a voice interaction apparatus is provided, including:
- a receive module, configured to receive a wakeup signal sent by at least one wakeup device in a plurality of electronic devices, wherein the wakeup signal is sent after the wakeup device collects a voice instruction of a user;
- a target device determining module, configured to determine, in response to the wakeup signal received by the receive module, at least one target device from the plurality of electronic devices;
- a first processing module, configured to send a voice recognition instruction to each target device, wherein the voice recognition instruction is used to instruct the target device to recognize a semantic meaning of the voice instruction to obtain semantic information;
- a second processing module, configured to determine a first response device in the at least one target device based on the semantic information obtained by the first processing module; and
- a third processing module, configured to send a first response instruction to the first response device determined by the second processing module, wherein the first response instruction is used to instruct the first response device to respond to the voice instruction.

According to a third aspect of this disclosure, a computer readable storage medium is provided, wherein the storage medium stores a computer program, and the computer program is used for implementing the voice interaction method described above.

According to a fourth aspect of this disclosure, an electronic device is provided, wherein the electronic device includes:
- a processor; and
- a memory, configured to store processor-executable instructions,
  wherein the processor is configured to read the executable instructions from the memory, and execute the instructions to implement the voice interaction method described above.

This disclosure provides a voice interaction method and apparatus, a computer readable storage medium, and an electronic device. At least one target device is determined from the plurality of electronic devices by receiving the wakeup signal sent by at least one wakeup device in the plurality of electronic devices in response to the voice instruction of the user. Each target device is instructed to recognize the semantic meaning of the voice instruction to obtain the semantic information, so as to determine the first response device in the at least one target device based on the semantic information. In this case, the first response device is enabled to respond to the voice instruction. In this way, a problem that it is difficult to interact with the user accurately when a plurality of electronic devices are in a same preset space is resolved, thereby facilitating user experience.

BRIEF DESCRIPTION OF THE DRAWINGS

By describing the embodiments of this disclosure more detailed with reference to the accompanying drawings, the foregoing and other objectives, features, and advantages of this disclosure will become more apparent. The accompanying drawings are used to provide further understanding of the embodiments of this disclosure, constitute a part of the specification, and are used to explain this disclosure together with the embodiments of this disclosure, but they do not constitute limitation to this disclosure. In the accompanying drawings, the same reference numerals generally represent the same components or steps.

DETAILED DESCRIPTION OF THE EMBODIMENTS

Figure 1:
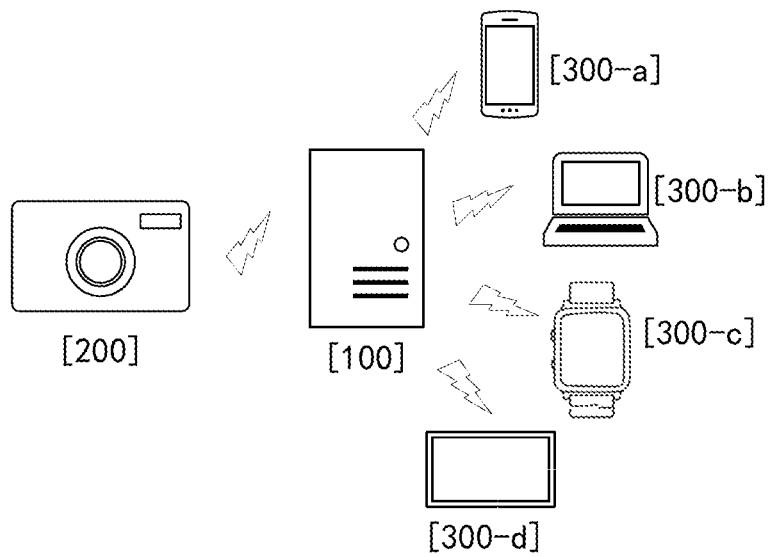
FIG. 1 is a schematic structural diagram of a voice interaction system according to an exemplary embodiment of this disclosure.

Exemplary embodiments of this disclosure are described below in detail with reference to the accompanying drawings. Obviously, the described embodiments are merely a part, rather than all of embodiments of this disclosure. It should be understood that this disclosure is not limited by the exemplary embodiments described herein.

It should be noted that unless otherwise specified, the scope of this disclosure is not limited by relative arrangement, numeric expressions, and numerical values of components and steps described in these embodiments.

Application Overview

A voice device is an electronic device that can interact with a user through voice, such as a smart speaker, a smartphone, or a smart vehicle-mounted device. The user can wake up a corresponding voice device by using a preset wakeup keyword to interact with the awakened voice device. However, when there are a plurality of voice devices in a use environment and wakeup keywords for the plurality of voice devices are consistent, a plurality of devices may interact with the user at the same time or sequentially when the user says the wakeup keyword.

Taking an assisted driving scenario or an autonomous driving scenario as an example, an in-vehicle space can include a plurality of electronic devices, such as a mobile phone, a smartwatch, a tablet computer, and a vehicle-mounted device (such as a vehicle-mounted display). After a voice instruction (such as "Hello, Little A"/"Little A, what time is it now") is sent by the user, various electronic devices in the vehicle can collect the voice instruction of the user through a built-in microphone or microphone array, and respond to the user when it is detected that the voice instruction of the user matches a bound wakeup keyword (for example, "I am here"/"The current time is 10:45"). However, if there are at least two electronic devices in the vehicle with wakeup keywords consistent with the voice instruction of the user, these electronic devices with the wakeup keywords consistent with the voice instruction of the user may all respond to the user. As a result, not only various voice devices may interfere with each other, which affects voice interaction with the user; but also a lot of noise may be generated, which affects driving safety of a driver.

Based on the foregoing technical problem, this disclosure provides a voice interaction system, method, and apparatus. Semantic analysis can be performed on the voice instruction of the user, and based on a result of the semantic analysis, a corresponding voice device can be controlled to perform voice interaction with the user. In this way, even when a plurality of voice devices are in a same space, precise voice interaction can be performed between the user and the voice devices, which facilitates user experience.

Herein, it should be noted that technical solutions provided in this disclosure can be applied to various scenarios of multi-device interaction, including but not limited to in-vehicle interaction scenarios in the field of assisted driving or autonomous driving, and voice interaction scenarios in the field of smart households.

Exemplary System

FIG. 1 is a schematic structural diagram of a voice interaction system according to an embodiment of this disclosure. The voice interaction system provided in this application can be applicable to a scenario where a user is driving or riding inside a vehicle. The vehicle may be, for example, a car. In addition, the voice interaction system can also be applicable to other types of motor vehicles or non-motor vehicles. It should be understood that the voice interaction system provided in this application can also be applicable to a multimode voice interaction scenario such as smart household voice interaction. This is not limited in this application.

The voice interaction system provided in this application includes a decision center 100 and a detector 200. The decision center 100 and the detector 200 may be connected through a wireless network. The wireless network can be any wireless communication system, such as a long term evolution (LTE) system or a 5th generation (5G) mobile communication system. In addition, the voice interaction system can also be applicable to future communication systems, such as a sixth generation mobile communication system and a seventh generation mobile communication system. The decision center 100 and the detector 200 may also be connected through a wired network, for example, are directly connected through a network cable.

Taking a scenario in which the voice interaction system provided in this application is applicable inside a vehicle as an example, the decision center 100 can be a plugin or a particular program of any electronic device in the vehicle, or can be any electronic device in the vehicle. This is not limited in this application. The decision center 100 can be connected to other electronic devices in the vehicle through a wired/wireless network to communicate with various electronic devices in the vehicle.

When being an electronic device, the decision center 100 can be customized according to a specific vehicle model and a hardware installation environment to implement different functions. At the same time, the decision center 100 can also implement more complex software functional logic, and support and execute platform applications, such as a "voice collaboration" application, of most development platforms. When the decision center 100 controls and runs the "voice collaboration" application, voice interaction between the user and each electronic device can be coordinated by processing a signal transmitted from other electronic devices (such as 300-a, 300-b, 300-c, or 300-d) that establish a communication connection with the decision center 100. The decision center 100 can also include at least one of a processor, a memory, a first interface to a $n^{th}$ interface for input/output, a communication bus, and the like. The processor can include one or more processing units, such as one or more of a microprocessor, a microcontroller, a central processing unit (CPU), a digital signal processor, a system chip, an application processor, a graphics processing unit (GPU), a modem processor, a video codec, a baseband processor, and a neural network processor. The memory can include a volatile memory and/or a non-volatile memory. The volatile memory can include, for example, a random access memory (RAM), and the non-volatile memory can include, for example, a read-only memory (ROM).

The detector 200 is configured to collect a signal from an external environment or a signal interacting with the outside. For example, the detector 200 can include an image collector such as a camera, and can be configured to collect an in-vehicle environmental scenario or an interaction behavior of the user. Alternatively, the detector can include a sound collector such as a microphone or a microphone array, and is configured to collect sound in the vehicle. Alternatively, the detector can include a temperature sensor, and is configured to collect ambient temperatures at various locations in the vehicle.

The detector 200 can assist the decision center 100 in coordinating the voice interaction between the user and each electronic device. For example, when the user sends a voice instruction, an image frame sequence collected by the detector 200 includes an image in which a line of sight of the user is directed towards a target electronic device. The detector 200 can send the collected image frame sequence to the decision center 100. After parsing the received image frame sequence, the decision center 100 can control the target electronic device to only respond to the voice instruction of the user.

In an exemplary embodiment, the detector 200 can further include a processor. The processor can include one or more processing units, such as one or more of a microprocessor, a microcontroller, a central processing unit, a digital signal processor, a system chip, an application processor, a graphics processing unit, a modem processor, a video codec, a baseband processor, and a neural network processor. Different processing units may be separate devices, or may be integrated into one or more processors. The processor in the detector 200 can run a preset algorithm program, such as a wakeup algorithm, to parse collected information such as sound or an image after an annular signal from at least one electronic device is received, thereby determining a target device and implementing other functions.

In an exemplary embodiment, the detector 200 can further include a memory. The memory can include a volatile memory and/or a non-volatile memory. The volatile memory can include, for example, a random access memory, and the non-volatile memory can include, for example, a read-only memory or a flash memory. The memory can store an algorithm program that can be executed by the processor, such as the wakeup algorithm; and can also store information such as sound or an image that is collected by the detector 200, as well as intermediate information and results generated by the processor during a process of executing the algorithm program.

In an exemplary embodiment, the decision center can determine at least one target device from various electronic devices connected to the decision center by receiving a wakeup signal sent by any electronic device in response to the voice instruction of the user; and instruct each target device to recognize a semantic meaning of the voice instruction to obtain semantic information, so as to determine a first response device in the at least one target device based on the semantic information. In this case, the first response device is enabled to respond to the voice instruction. In this way, a problem that it is difficult for a plurality of devices to interact with the user accurately is resolved, thereby facilitating user experience.

The technical solutions provided in this embodiment can be implemented through software, hardware, and any combination of software and hardware. The hardware can provide input for sound and images, while the software can be implemented through a C++ programming language, Java, or the like. A voice interaction function can be developed and implemented based on a Python programming language, or can also be implemented through other software and hardware. Specific hardware, software structure, or function for implementing the technical solutions is not limited in this disclosure.

Exemplary Method

Figure 2:
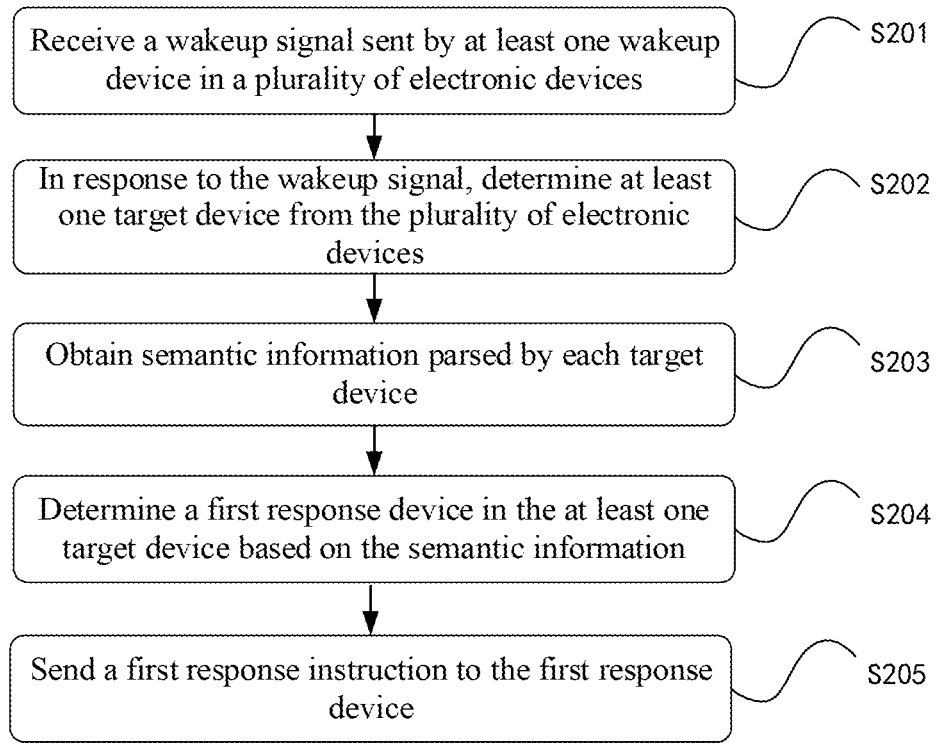
FIG. 2 is a schematic flowchart of determining a target device according to an exemplary embodiment of this disclosure.

FIG. 2 is a schematic flowchart of a voice interaction method according to an exemplary embodiment of this disclosure. This embodiment can be implemented through a decision center. As shown in FIG. 2, the voice interaction method provided in an exemplary embodiment of this disclosure includes at least the following steps.

Step 201, receive a wakeup signal sent by at least one wakeup device in a plurality of electronic devices.

The electronic device includes a voice device and a non-voice device. The voice device is a device that can interact with a user through voice, such as a smartphone, a smartwatch, a tablet computer, or a vehicle-mounted device that has a voice interaction function. The voice device usually has a built-in microphone or microphone array. The microphone or the microphone array in the voice device can be configured to collect sound of the user and/or respond based on the collected sound. The non-voice device is a device that cannot interact with the user through voice, such as an electronic watch/a mechanical watch or a bracelet that does not have a voice interaction function. It should be noted that the non-voice device can also have a built-in microphone or microphone array. The microphone or the microphone array in the non-voice device can be configured to collect sound of the user and/or play particular audio, but cannot respond based on the collected sound.

After a voice instruction is sent by the user, at least one electronic device can collect the voice instruction of the user by using a built-in microphone or microphone array to generate the wakeup signal, and send the wakeup signal to the decision center 100. The voice device that generates the wakeup signal and sends the wakeup signal to the decision center 100 is a wakeup device. The wakeup signal can be a preset first digital signal. After collecting the voice instruction of the user, the wakeup device can automatically generate the first digital signal. The wakeup device sends the first digital signal and the collected voice instruction together to the decision center 100. The wakeup signal can also be a second digital signal that is generated based on the collected voice instruction of the user and that corresponds to the voice instruction. The wakeup device sends the second digital signal to the decision center 100.

Step 202, in response to the wakeup signal, determine at least one target device from the plurality of electronic devices.

After receiving the wakeup signal sent by the wakeup device, the decision center 100 can determine both a voice device and a non-voice device that communicate with the decision center 100 as target devices, or only the voice device communicating with the decision center 100 as a target device.

Step 203, obtain semantic information parsed by each target device.

The decision center 100 can send a voice recognition instruction to each target device. The voice recognition instruction is used to instruct each target device to start voice recognition. After receiving the voice recognition instruction, each target device can start a voice recognition function to obtain the voice instruction of the user; perform semantic recognition on the voice instruction of the user to obtain the semantic information corresponding to the voice instruction; and send the semantic information to the decision center.

In specific implementations, each target device can obtain the voice instruction of the user in at least two different ways.

In a first implementation, after the target devices are determined by the decision center, at least one target device in the target devices can play response information, where the response information may be voice information. For example, the at least one target device plays "Hello", "I am here", or other voice to perform voice interaction with the user and remind the user to continue to send a voice instruction. In addition, the response information may also be formal information, such as a dynamic effect played on a display screen of any target device. This is not limited in this embodiment of this disclosure. The decision center 100 can send the voice recognition instruction to each target device after the response information is played on the target device, to enable each target device to start voice recognition. In this way, the voice instruction subsequently sent by the user can be obtained and recognized by each target device to obtain corresponding semantic information.

In a second implementation, after the target devices are determined by the decision center, the target device does not need to play the response information. The decision center sends the voice recognition instruction to each target device without interaction with the user, to enable each target device to start voice recognition. The voice recognition instruction can also include a voice instruction previously sent by the user, such as the voice instruction sent in step S201. In this way, the target device can perform semantic recognition on the voice instruction previously sent by the user.

In the second implementation, the user does not need to repeat the same voice instruction if the user has already expressed his true intention through the previously sent voice instruction, such as "Call A", "Go to restaurant XX", or "Play the next song". If the user has not expressed the true intention or a complete instruction through the previously sent voice instruction, but only expressed, for example, the content such as "Hello, Little A" or "I need to adjust the seat", or other intention, the user can continue to send a voice instruction in the following. Each target device performs voice recognition on the voice instruction that is continue to be sent by the user, to obtain corresponding semantic information.

The voice recognition function of each target device can be implemented on a device locally or in a cloud. This is not limited in this embodiment of this application. For example, when the voice recognition function of each target device is implemented in the cloud, each target device can establish a communication connection to a server. The server can store a large amount of standard voice instructions labeled with semantic information. After receiving the voice recognition instruction sent by the decision center 100, each target device can send the received voice instruction to the server. After receiving the voice instruction sent by each target device, the server can match the voice instruction with the stored standard voice instructions to obtain a stored standard voice instruction with the highest similarity to a target voice instruction, and return semantic information corresponding to the standard voice instruction to each target device. After receiving the semantic information returned by the server, each target device can send the semantic information to the decision center 100.

Step 204, determine a first response device in the at least one target device based on the semantic information.

The first response device is a target device that responds to the voice instruction of the user based on the semantic information. For example, if the voice instruction of the user is "Call A", each target device recognizes the voice instruction of the user and then sends the semantic information corresponding to "Call A" to the decision center 100. The decision center 100 can determine a mobile phone in a vehicle as the first response device based on the received semantic information. For another example, if the voice instruction of the user is "Go to restaurant XX", each target device recognizes the voice instruction of the user and then sends the semantic information corresponding to "Go to restaurant XX" to the decision center 100. The decision center 100 can determine a vehicle-mounted device with a navigation function as the first response device based on the received semantic information.

Step 205, send a first response instruction to the first response device.

The first response instruction can include the semantic information corresponding to the voice instruction of the user. The first response instruction is used to instruct the first response device to respond to the voice instruction of the user based on the semantic information. For example, if the voice instruction of the user is "Call A", the decision center 100 determines a mobile phone as the first response device, and then sends the first response instruction to the mobile phone. The first response instruction can include the semantic information corresponding to the voice instruction "Call A". The mobile phone can make a corresponding response (sending a call invitation to A) in response to the received first response instruction. For another example, if the voice instruction of the user is "Go to restaurant XX", the decision center 100 determines a vehicle-mounted device with the navigation function as the first response device and then sends the first response instruction to the vehicle-mounted device. The first response instruction can include the semantic information corresponding to the voice instruction "Go to restaurant XX". The mobile phone can make a corresponding response (starting navigation voice and/or a navigation screen for "Go to restaurant XX") in response to the received first response instruction.

In an implementation, if the decision center determines that the first response device has performed voice recognition on the voice instruction of the user and has obtained the semantic information (for example, the decision center has previously received the semantic information recognized by the first response device), the first response instruction sent by the decision center to the first response device can exclude the semantic information, thereby reducing signaling overhead.

In this embodiment, the decision center 100 can determine at least one target device from the various electronic devices by receiving the wakeup signal sent by at least one wakeup device in the various electronic devices in response to the voice instruction of the user; and instruct each target device to recognize a semantic meaning of the voice instruction to obtain the semantic information, so as to determine the first response device in the various target devices based on the semantic information. In this case, the first response device is enabled to respond to the voice instruction. In this way, a problem that it is difficult for a plurality of devices to interact with the user accurately is resolved, thereby facilitating user experience.

Figure 3:
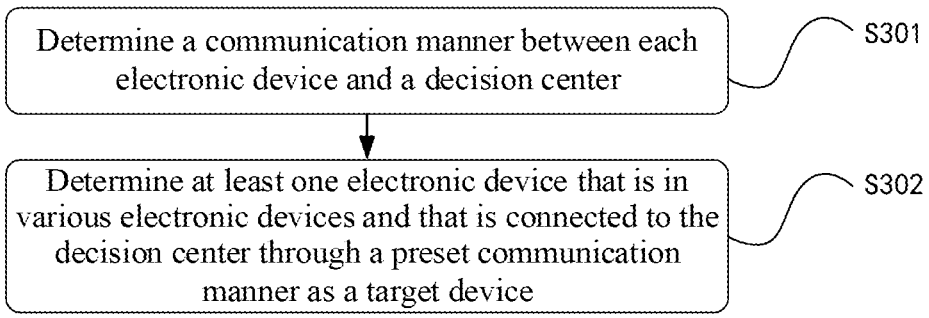
FIG. 3 is a schematic flowchart of determining a target device according to an exemplary embodiment of this disclosure.

FIG. 3 shows a schematic flowchart of a step of determining at least one target device according to the embodiment shown in FIG. 2.

As shown in FIG. 3, on the basis of the embodiment shown in FIG. 2, in an exemplary embodiment of this disclosure, step 202 of determining at least one target device can specifically include the following steps.

Step 301, determine a communication manner between each electronic device and a decision center.

A preset communication manner is a preset communication manner that a communication range between each electronic device and the decision center 100 is within a preset space. The preset space can be an in-vehicle space. The preset communication manner includes, but is not limited to short range communication manners such as Bluetooth protocol communication and wired network communication, and communication manners such as local area network (LAN), wireless local area network (WLAN), and another wireless network. The communication manner can be set according to a size of a space inside the vehicle. This is not limited in this application.

Step 302, determine at least one electronic device that is in the various electronic devices and that is connected to the decision center through a preset communication manner as the target device.

In some embodiments, each electronic device connected to the decision center 100 through the preset communication manner can be determined as a target device. For example, electronic devices in the vehicle include a smartphone, a smartwatch, a tablet computer, and a vehicle-mounted device. The vehicle-mounted device is connected to the decision center 100 through Bluetooth, and the smartphone, the smartwatch, and the tablet computer are respectively connected to the decision center 100 through a wireless network. After a voice instruction is sent by the user, the smartphone, the smartwatch, the tablet computer, and the vehicle-mounted device can all collect the voice instruction of the user and generate and send wakeup signals to the decision center 100. The decision center 100 responds to the received wakeup signal. If it is detected that the smartphone, the smartwatch, the tablet computer, and the vehicle-mounted device are all connected to the decision center 100 through the preset communication manner (a communication manner with a communication range within the in-vehicle space), then the smartphone, the smartwatch, the tablet computer, and the vehicle-mounted device are all determined as target devices.

In some embodiments, the various electronic devices can also include at least one candidate device. The candidate device is a voice device connected to the decision center 100 through the preset communication manner. At least one target device can be determined from the at least one candidate device based on wakeup voice used to wake up the at least one candidate device. For example, the electronic devices in the vehicle include a smartphone, a smartwatch, a tablet computer, and a vehicle-mounted device. Wakeup voice corresponding to the smartphone and the vehicle-mounted device is "Hello, Little A". After a voice instruction of "Hello, Little A" is sent by the user, the smartphone, the smartwatch, the tablet computer, and the vehicle-mounted device can all collect the voice instruction of the user and generate and send wakeup signals to the decision center 100. The decision center 100 responds to the received wakeup signal. If it is detected that the smartphone, the smartwatch, the tablet computer, and the vehicle-mounted device are all connected to the decision center 100 through the preset communication manner (a communication manner with a communication range within the in-vehicle space), then the smartphone, the smartwatch, the tablet computer, and the vehicle-mounted device are all determined as candidate devices. Wakeup keywords for the smartphone, the smartwatch, the tablet computer, and the vehicle-mounted device are detected. If it is detected that the wakeup voice corresponding to the smartphone and the vehicle-mounted device matches the voice instruction of the user, that is, is "Hello, Little A", then the smartphone and the vehicle-mounted device are determined as target devices.

Figure 4:
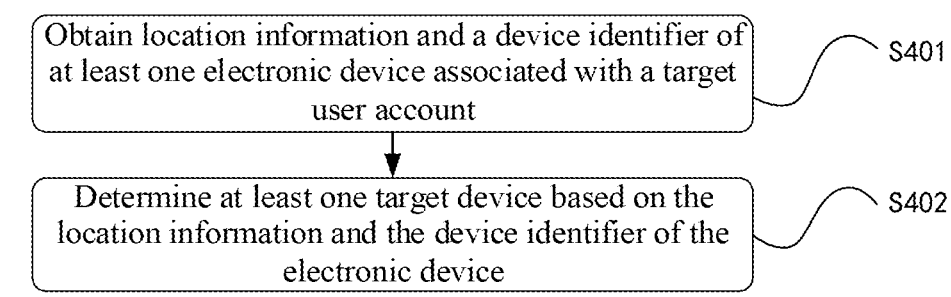
FIG. 4 is a schematic flowchart of determining a target device according to an exemplary embodiment of this disclosure.

FIG. 4 shows a schematic flowchart of a step of determining at least one target device according to the embodiment shown in FIG. 2.

As shown in FIG. 4, on the basis of the embodiment shown in FIG. 2, in an exemplary embodiment of this disclosure, step 202 of determining at least one target device can specifically include the following steps.

Step 401, obtain location information and a device identifier of at least one electronic device associated with a target user account.

In some embodiments, an electronic device in a preset space (such as an in-vehicle space) and the decision center 100 can be logged in to a same user account in advance, that is, the target user account. After receiving the wakeup signal sent by any electronic device, the decision center 100 can obtain the location information and the device identifier of each electronic device associated with the target user account. The location information may be a coordinate of each electronic device in a reference coordinate system with the decision center 100 as an origin, or may be information about longitude and latitude of each electronic device. This is not limited in this application. The device identifier may be device information of each electronic device, such as a device ID (each electronic device corresponds to a device ID), or may be encoding information for encoding each electronic device in advance. For example, the various electronic devices may be encoded based on a time sequence of establishing communication connections between the electronic devices and the decision center, to generate the encoding information.

In some embodiments, electronic devices in a preset space (such as an in-vehicle space) can be logged in to a same user account in advance, that is, the target user account. When sending the wakeup signal to the decision center 100, each electronic device may also send the target user account to the decision center 100. After receiving the target user account, the decision center 100 can obtain the location information and the device identifier of each electronic device associated with the target user account.

In some embodiments, the decision center 100 and each electronic device can respectively establish a communication connection to a server. The decision center 100 and each electronic device in a preset space (such as an in-vehicle space) can be logged in to a same user account (the target user account). After receiving the wakeup signal sent by any electronic device, the decision center 100 can send an acquisition request to the server. The acquisition request includes the target user account, to request the server to obtain the location information and the device identifier of each electronic device associated with the target user account.

In some embodiments, the decision center 100 and each electronic device can respectively establish a communication connection to a server. The electronic devices in a preset space (such as an in-vehicle space) can be logged in to a same user account (the target user account). When sending the wakeup signal to the decision center 100, each electronic device may also send the target user account to the decision center 100. After receiving the wakeup signal sent by any electronic device, the decision center 100 can send an acquisition request to the server. The acquisition request includes the target user account, to request the server to obtain the location information and the device identifier of each electronic device associated with the target user account.

Step 402, determine at least one target device based on the location information and the device identifier of the electronic device.

After receiving the location information and the device identifier of each electronic device, the decision center 100 can detect location information within the preset space (such as the in-vehicle space), and obtain a device identifier corresponding to the location information within the preset space (such as the in-vehicle space) to determine the electronic device corresponding to the device identifier as the target device.

In some embodiments, the foregoing electronic device corresponding to the device identifier can also be determined as a candidate device, and at least one target device can be determined from the candidate device based on wakeup voice used to wake up the candidate device. For example, the electronic devices include a smartphone, a smartwatch, a tablet computer, and a vehicle-mounted device. Wakeup voice corresponding to the smartphone and the vehicle-mounted device is "Hello, Little A". After a voice instruction of "Hello, Little A" is sent by the user, the smartphone, the smartwatch, the tablet computer, and the vehicle-mounted device can all collect the voice instruction of the user and generate and send wakeup signals to the decision center 100. The decision center 100 responds to the received wakeup signal. If it is determined, based on location information of the smartphone, the smartwatch, the tablet computer, and the vehicle-mounted device that is obtained through detection, that the smartphone, the tablet computer, and the vehicle-mounted device are all located in the in-vehicle space while the smartwatch is located in a space outside the vehicle, the smartphone, the tablet computer, and the vehicle-mounted device are determined as candidate devices. Wakeup keywords for the smartphone, the tablet computer, and the vehicle-mounted device are detected. If it is detected that the wakeup voice corresponding to the smartphone and the vehicle-mounted device matches the voice instruction of the user, that is, is "Hello, Little A", the smartphone and the vehicle-mounted device are determined as target devices.

Figure 5:
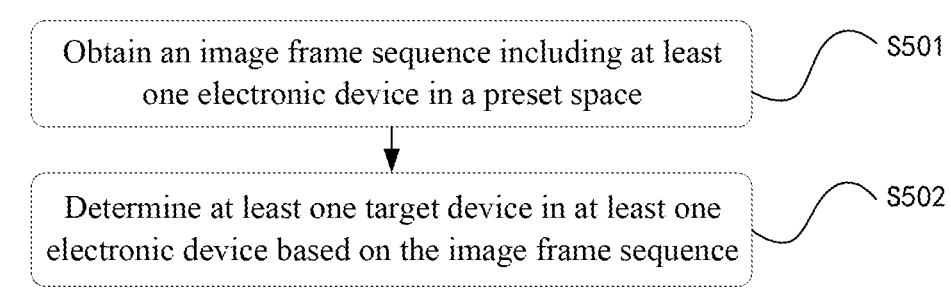
FIG. 5 is a schematic flowchart of determining a target device according to an exemplary embodiment of this disclosure.

FIG. 5 shows a schematic flowchart of a step of determining at least one target device according to the embodiment shown in FIG. 2.

As shown in FIG. 5, on the basis of the embodiment shown in FIG. 2, in an exemplary embodiment of this disclosure, step 202 of determining at least one target device can specifically include the following steps.

Step 501, obtain an image frame sequence including at least one electronic device in a preset space.

In some embodiments, the preset space may be an in-vehicle space. A camera can be disposed in the vehicle. The camera can be mounted around a rear-view mirror inside the vehicle, or can be mounted at any location inside the vehicle. There may be one or more cameras. This is not limited in this application. When collecting images inside the vehicle, the camera may record an environment inside the vehicle in a real-time manner to obtain video images, and store the obtained video images in frames according to a time sequence of photographing, so as to generate image frame sequences arranged according to the time sequence of photographing. Each image frame in the image frame sequence includes an image of at least one electronic device.

Step 502, determine the at least one target device in at least one electronic device based on the image frame sequence.

In some embodiments, a classification model can be used to detect the image frame sequence, to determine the at least one target device in the at least one electronic device. The classification model can be obtained by training an initial model with a classification function. During training of the initial model, an electronic-device image set including a plurality of categories can be used as training data. The electronic-device image set includes a plurality of electronic-device images, and each electronic-device image is pre-labeled with a corresponding category label. Predicting a category of each electronic-device image by using the initial model can obtain a prediction label corresponding to each electronic device. A loss value can be calculated based on the prediction label and the category label corresponding to each electronic device. A model parameter of the initial model is adjusted based on the loss value, and the classification model is obtained when a preset training condition is met.

A category of the electronic device that corresponds to the each electronic-device image in the image frame sequence can be obtained by detecting the image frame sequence by using the classification model obtained through training. In this way, the electronic device in a preset space (such as an in-vehicle space) is determined, and the electronic device in the preset space (such as the in-vehicle space) is determined as a target device.

In some embodiments, device information in the image frame sequence can be recognized by using an optical character recognition (OCR) technology. The device information includes, but is not limited to, a device ID, a device serial number, and a device icon. The electronic device in a preset space (such as an in-vehicle space) can be determined based on the recognized device information, and the electronic device in the preset space (such as the in-vehicle space) is determined as a target device.

In some embodiments, the electronic device in a preset space (such as an in-vehicle space) that is detected based on the image frame sequence can be determined as a candidate device. Moreover, at least one target device can be determined from the candidate device based on wakeup voice used to wake up the candidate device. For example, the electronic devices include a smartphone, a smartwatch, a tablet computer, and a vehicle-mounted device. Wakeup voice corresponding to the smartphone and the vehicle-mounted device is "Hello, Little A". After a voice instruction of "Hello, Little A" is sent by the user, if it is determined based on the image frame sequence collected by the camera that the smartphone, the tablet computer, and the vehicle-mounted device are all located in the in-vehicle space, then the smartphone, the tablet computer, and the vehicle-mounted device are determined as candidate devices.

Wakeup keywords for the smartphone, the tablet computer, and the vehicle-mounted device are detected. If it is obtained, after the detection, that the wakeup voice corresponding to the smartphone and the vehicle-mounted device matches the voice instruction of the user, that is, it is "Hello, Little A", the smartphone and the vehicle-mounted device are determined as target devices.

Figure 6:
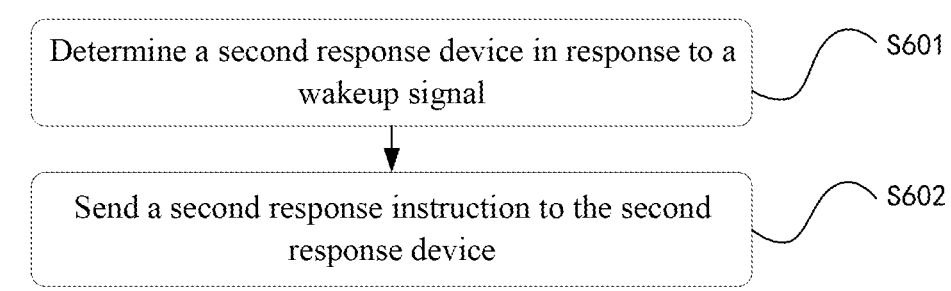
FIG. 6 is a schematic flowchart of responding to a wakeup signal by a decision center according to an exemplary embodiment of this disclosure.

FIG. 6 shows a schematic flowchart of responding to the wakeup signal by the decision center 100 according to the embodiment shown in FIG. 2.

As shown in FIG. 6, on the basis of the embodiment shown in FIG. 2, in an exemplary embodiment of this disclosure, step 202 of responding to a wakeup signal can specifically include the following steps.

Step 601, determine a second response device in response to the wakeup signal.

The second response device is the target device configured to play an announcement. The announcement can be preset. For example, the announcement can be preset to "I am here", "Processing, please wait a moment", or "Hello", to notify the user that the decision center 100 is coordinating the target devices based on the voice instruction of the user, without requiring the user to repeat the voice instruction.

In some embodiments, each electronic device with an audio play function in a preset space can be determined as the second response device. A quantity of the second response devices can be set according to requirements. To reduce interference of the second response devices on the user during playing the announcement and reduce noise, the quantity of the second response devices can be set to one. To be specific, each time the user sends a voice instruction, the decision center 100 determines only one of the target devices as the second response device.

In some embodiments, it can be preset to determine an electronic device with an audio play function in a preset space as the second response device. In other words, no matter what voice instruction the user sends, the voice instruction is responded to by the preset electronic device with the audio play function.

In some embodiments, the wakeup device in the at least one target device sends the wakeup signal to the decision center 100. The wakeup signal can include device identifiers corresponding to all wakeup devices. The decision center 100 can determine the wakeup device corresponding to a device identifier received first as the second response device.

In some embodiments, in response to the received wakeup signal sent by each wakeup device, the decision center 100 can control to start a camera in a preset space (such as an in-vehicle space), so that the camera is enabled to collect video images within the preset space and store the obtained video images in frames according to a time sequence of photographing, so as to generate an image frame sequence arranged according to the time sequence of photographing. Each image frame in the image frame sequence includes a character image of the user who sends the voice instruction. The image frame sequence is composed of consecutive image frames arranged according to the time sequence of photographing, and a time interval between two adjacent image frames is very small and can be ignored. Therefore, a posture of the user can be analyzed based on the character image in each image frame to determine behavior information of the user, and the second response device can be determined based on the behavior information of the user.

The obtained image frame sequence can be input into a pre-trained posture detection model. For example, the image frame sequence is input into a pre-trained faster RCNN model. The faster RCNN model can process the image frames in the image frame sequence in turns, segment the character image for each image frame, and recognize character images obtained through segmentation to obtain key-point information of each character image. The key-point information of the character image can include facial key points (key points of five sense organs), a hand key point, an arm key point, and a torso key point of the character image. Posture information of the user in each image frame can be obtained based on the key-point information of each detected character image, and the posture information of the user in all image frame can be fused to obtain the posture of the user, so as to determine the behavior information of the user.

The behavior information can include, but is not limited to information about a line-of-sight direction of the user and gesture information of the user. The second response device can be determined based on the behavior information of the user. For example, if it is detected that a line of sight of the user is directed towards a target device in the image frame for a period of time, the target device to which the line of sight of the user is directed can be determined as the second response device. That the line of sight of the user is directed towards a target device is the information about the line-of-sight direction of the user. For another example, if it is detected that a finger of the user points at a target device in the image frame for a period of time, the target device pointed at by the finger of the user can be determined as the second response device. That the finger of the user points at a target device is the gesture information of the user. For another example, each target device in the vehicle can be pre-bound to a particular gesture. For example, the target devices in the vehicle include a smartphone and a vehicle-mounted device. In this case, the smartphone can be pre-bound to a first clenching gesture of the user, and the vehicle-mounted device can be pre-bound to an arm-waving gesture of the user. When the user sends a voice instruction and makes a first clenching gesture, the decision center 100 can determine the smartphone in the preset space as the second response device.

Step 602, send a second response instruction to the second response device.

The second response instruction is used to instruct the second response device to play the preset announcement. After determining the second response device, the decision center 100 can send the second response instruction to the second response device. After receiving the second response instruction sent by the decision center 100, the second response device can play the preset announcement.

Figure 7:
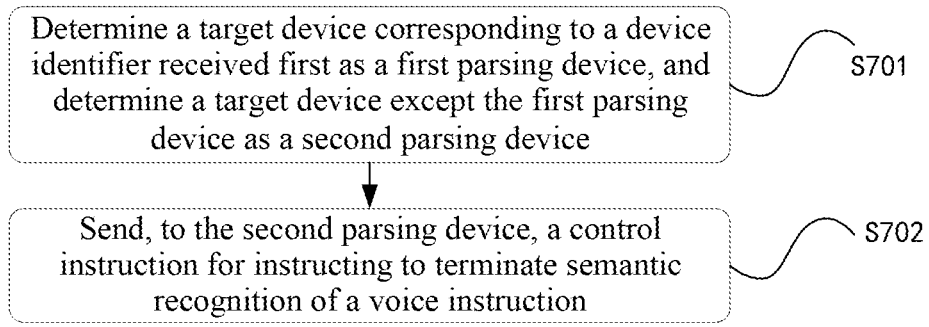
FIG. 7 is a schematic flowchart of determining a first parsing device and a second parsing device according to an exemplary embodiment of this disclosure.

FIG. 7 shows a schematic flowchart of determining a first parsing device and a second parsing device.

As shown in FIG. 7, on the basis of the embodiment shown in FIG. 2, in an exemplary embodiment of this disclosure, the semantic information includes device identifiers. Before step 204 of determining the first response device in the various target devices based on the semantic information, the following steps can also be included.

Step 701, determine the target device corresponding to a device identifier received first as a first parsing device, and determine the target device except the first parsing device as a second parsing device.

After recognizing the voice instruction of the user to obtain the semantic information, each target device can send the semantic information to the decision center 100. Due to different time required by the target devices to recognize the voice instruction, although the target devices recognize the voice instruction at a same time point, time points at which recognition is completed may also be different. Due to different communication connections and communication distances between the target devices and the decision center, although time required by the target devices to complete recognizing the voice instruction to obtain the semantic information is the same, time required by the decision center 100 to receive the semantic information sent by the target devices may also be different. To save memory resources for decision center 100, the decision center 100 can determine the target device corresponding to the device identifier received first as the first parsing device, determine the target device except the first parsing device as the second parsing device, and no longer receive the semantic information sent by the second parsing device after receiving the semantic information sent by the first parsing device.

Step 702, send, to the second parsing device, a control instruction for instructing to terminate semantic recognition of the voice instruction, so as to enable the second parsing device that receives the control instruction to terminate the semantic recognition of the voice instruction.

In some embodiments, each second parsing device may occupy memory resources when performing semantic recognition on the voice instruction. To save memory resources for each second parsing device, after determining the first parsing device and the second parsing device, the decision center 100 can send the control instruction for instructing to terminate the semantic recognition of the voice instruction to each second parsing device. After receiving the control instruction, each second parsing device stops performing the semantic recognition on the voice instruction, thereby saving memory resources for each second parsing device.

In view of the above, this disclosure discloses a voice interaction method, in which at least one target device is determined from the various electronic devices by receiving the wakeup signal sent by at least one wakeup device in the various electronic devices in response to the voice instruction of the user, and each target device is instructed to recognize the semantic meaning of the voice instruction to obtain the semantic information, so as to determine the first response device in the target devices based on the semantic information. In this case, the first response device is enabled to respond to the voice instruction. In this way, a problem that it is difficult for a plurality of devices to interact with the user accurately is resolved, thereby facilitating user experience.

Exemplary Apparatus

Figure 8:
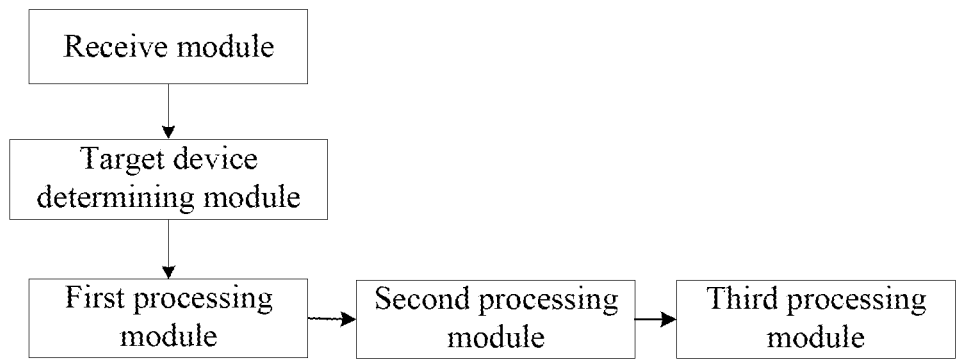
FIG. 8 is a schematic structural diagram of a voice interaction apparatus according to an exemplary embodiment of this disclosure.

FIG. 8 is a schematic structural diagram of a voice interaction apparatus according to an embodiment of this disclosure. The apparatus is configured to implement all or some of the functions of the aforementioned method embodiments. Specifically, the voice interaction apparatus includes a receive module, a target device determining module, a first processing module, a second processing module, and a third processing module. In addition, the apparatus can also include other more modules, such as a storage module and a sending module. This is not limited in this embodiment.

In some embodiments, the receive module is configured to receive a wakeup signal sent by at least one wakeup device in various electronic devices. The wakeup signal is sent by the wakeup device after collecting a voice instruction of a user. The target device determining module is configured to determine, in response to the wakeup signal received by the receive module, at least one target device from the various electronic devices. The first processing module is configured to obtain semantic information parsed by each target device. The second processing module is configured to determine a first response device in the target devices based on the semantic information obtained by the first processing module. The third processing module is configured to send a first response instruction to the first response device determined by the second processing module, where the first response instruction is used to instruct the first response device to respond to the voice instruction.

Optionally, in an implementation of this embodiment, in response to the wakeup signal, determining at least one target device from the various electronic devices includes: determining at least one electronic device that is in the various electronic devices and that is connected to a decision center through a preset communication manner as the target device, where a communication range of the preset communication manner is within a preset space.

Optionally, in an implementation of this embodiment, in response to the wakeup signal, determining at least one target device from the various electronic devices includes: obtaining location information and a device identifier of at least one electronic device associated with a target user account; and determining at least one target device based on the location information and the device identifier of the electronic device, where the at least one target device is located within the preset space.

Figure 9:
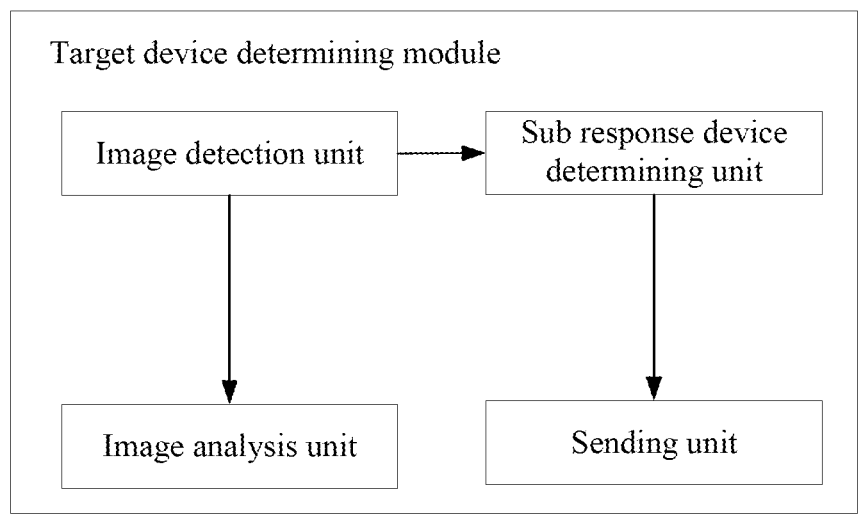
FIG. 9 is a schematic structural diagram of a target device determining module according to an exemplary embodiment of this disclosure.

FIG. 9 is a schematic structural diagram of a target device determining module according to an exemplary embodiment of this disclosure. As shown in FIG. 9, the target device determining module further includes an image detection unit and an image analysis unit. The image detection unit is configured to obtain an image frame sequence including images within the preset space. The image analysis unit is configured to detect electronic devices in the image frame sequence based on the image frame sequence obtained by the image detection module, and determine at least one target device based on the electronic devices in the detected image frame sequence.

Further, as shown in FIG. 9, the target device determining module can further include a sub response device determining unit and a sending unit. The sub response device determining unit is configured to determine a second response device in response to the wakeup signal (for example, determine the second response device by using the image frame sequence detected by the image detection unit). The second response device is the target device that is configured to play a preset announcement. The sending unit is configured to send a second response instruction to the second response device, to instruct the second response device to play the preset announcement.

Optionally, in an implementation of this embodiment, the wakeup signal includes device identifiers. Determining the second response device in response to the wakeup signal includes: determining the wakeup device corresponding to a device identifier received first as the second response device.

Optionally, in an implementation of this embodiment, determining the second response device in response to the wakeup signal includes: obtaining an image frame sequence including the user; determining behavior information of the user based on the image frame sequence; and determining the second response device based on the behavior information of the user.

Optionally, in an implementation of this embodiment, the semantic information includes device identifiers, and before determining the first response device in the various target devices based on the semantic information, the following steps are included:

determining the target device corresponding to a device identifier received first as a first parsing device, and determining the target device except the first parsing device as a second parsing device; and sending, to the second parsing device, a control instruction for instructing to terminate semantic recognition of the voice instruction, whereby the second parsing device that receives the control instruction terminates the semantic recognition of the voice instruction.

In addition, in this device embodiment, functions of the modules shown in FIG. 8 correspond to the method embodiments shown in FIG. 2. For example, the receive module is configured to perform the method step 201; the target device determining module is configured to perform the method step 202; the first processing module is configured to perform the method step 203; the second processing module is configured to perform the method step 204; and the third processing module is configured to perform the method step 205.

Exemplary Electronic Device

An electronic device according to an embodiment of this disclosure is described below with reference to FIG. 10. The electronic device may be any one or two of a first device 100 and a second device 200, or a stand-alone device separated from the first device and the second device. The stand-alone device may communicate with the first device and the second device, to receive a collected input signal therefrom.

Figure 10:
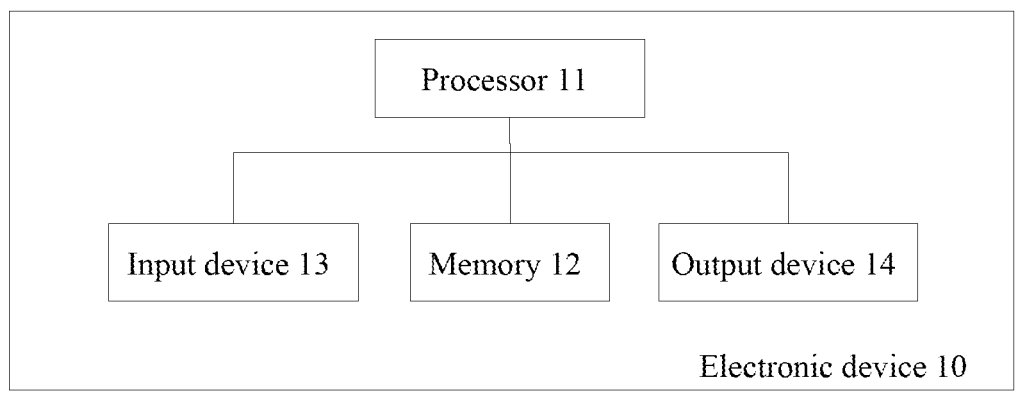
FIG. 10 is a structural diagram of an electronic device according to an exemplary embodiment of this disclosure.

FIG. 10 shows a block diagram of an electronic device according to an embodiment of this disclosure.

As shown in FIG. 10, an electronic device 10 includes one or more processors 11 and a memory 12.

The processor 11 may be a central processing unit (CPU) or other forms of processing units having a data processing capability and/or an instruction execution capability, and can control other components in the electronic device 10 to perform a desired function.

The memory 12 can include one or more computer program products. The computer program product can include various forms of computer readable storage media, such as a volatile memory and/or a non-volatile memory. The volatile memory can include, for example, a random access memory (RAM) and/or a cache. The nonvolatile memory can include, for example, a read-only memory (ROM), a hard disk, and a flash memory. One or more computer program instructions can be stored on the computer readable storage medium. The processor 11 can execute the program instruction(s) to implement the voice interaction method according to various embodiments of this disclosure that are described above and/or other desired functions. Various contents such as an input signal, a signal component, and a noise component can also be stored in the computer readable storage medium.

In an example, the electronic device 10 can further include an input device 13 and an output device 14. These components are connected with each other through a bus system and/or other forms of connection mechanisms (not shown).

For example, when the electronic device is the first device 100 or the second device 200, the input device 13 may be a microphone or a microphone array, which is configured to capture an input signal of a sound source. When the electronic device is a stand-alone device, the input device 13 may be a communication network connector for receiving the collected input signal from the first device 100 and the second device 200.

The input device 13 can further include, for example, a keyboard and a mouse.

The output device 14 can output various information to the outside, including determined distance information, direction information, and the like. The output device 14 can include, for example, a display, a loudspeaker, a printer, a communication network, and a remote output device connected to the communication network.

Certainly, for simplicity, FIG. 12 shows only some of components in the electronic device 10 that are related to this disclosure, and components such as a bus and an input/output interface are omitted. In addition, according to specific application situations, the electronic device 10 can further include any other appropriate components.

Exemplary Computer Program Product and Computer Readable Storage Medium

In addition to the foregoing method and apparatus, the embodiments of this disclosure can also relate to a computer program product, which includes computer program instructions. When the computer program instructions are run by a processor, the processor is enabled to perform the steps, of the voice interaction method according to the embodiments of this disclosure, that are described in the "exemplary method" part of this specification.

The computer program product may be program codes, written with one or any combination of a plurality of programming languages, that are configured to perform the operations in the embodiments of this disclosure. The programming languages include an object-oriented programming language such as Java or C++, and further include a conventional procedural programming language such as a "C" language or a similar programming language. The program codes can be entirely or partially executed on a user computing device, executed as an independent software package, partially executed on the user computing device and partially executed on a remote computing device, or entirely executed on the remote computing device or a server.

In addition, the embodiments of this disclosure can further relate to a computer readable storage medium, which stores computer program instructions. When the computer program instructions are run by the processor, the processor is enabled to perform the steps, of the voice interaction method according to the embodiments of this disclosure, that are described in the "exemplary method" part of this specification.

The computer readable storage medium may be one readable medium or any combination of a plurality of readable media. The readable medium may be a readable signal medium or a readable storage medium. The readable storage medium can include, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, it should be pointed out that the advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

The foregoing descriptions are given for illustration and description. In addition, the description is not intended to limit the embodiments of this disclosure to forms disclosed herein. Although a plurality of exemplary aspects and embodiments have been discussed above, a person skilled in the art may recognize certain variations, modifications, changes, additions, and sub-combinations thereof. In this way, if these modifications and variations of this application fall within the scope of the claims and equivalent technologies of the claims of this disclosure, this disclosure also intends to include these modifications and variations.

What is claimed is:

1. A voice interaction method, wherein the method comprises:
   receiving a wakeup signal sent by at least one wakeup device in a plurality of electronic devices, wherein the wakeup signal is sent after the wakeup device collects a voice instruction of a user;
   in response to the wakeup signal, determining at least one target device from the plurality of electronic devices, wherein the at least one target device is located within a preset space, and a wakeup voice corresponding to the at least one target device matches the voice instruction;
   in response to the wakeup signal, determining a second response device from the at least one target device, wherein the second response device is a target device that is configured to play a preset announcement;
   sending a second response instruction to the second response device to instruct the second response device to play the preset announcement;
   obtaining semantic information parsed by each target device;
   determining a first response device in the at least one target device based on the semantic information; and
   sending a first response instruction to the first response device, wherein the first response instruction is used to instruct the first response device to respond to the voice instruction.

2. The method according to claim 1, wherein the in response to the wakeup signal, determining at least one target device from the plurality of electronic devices comprises:
   determining at least one electronic device that is in the plurality of electronic devices and that is connected to a decision center through a preset communication manner as the target device, wherein a communication range of the preset communication manner is within the preset space.

3. The method according to claim 1, wherein the in response to the wakeup signal, determining at least one target device from the plurality of electronic devices comprises:
   obtaining location information and a device identifier of at least one of the electronic devices associated with a target user account; and
   determining at least one target device based on the location information and the device identifier of the electronic device, wherein the at least one target device is located within the preset space.

4. The method according to claim 1, wherein the wakeup signal comprises device identifiers, and the in response to the wakeup signal, determining second response device comprises:
   determining a wakeup device corresponding to a device identifier received first as the second response device.

5. The method according to claim 1, wherein the in response to the wakeup signal, determining a second response device comprises:
   obtaining an image frame sequence comprising the user;
   determining behavior information of the user based on the image frame sequence; and
   determining the second response device based on the behavior information of the user.

6. The method according to claim 1, wherein the semantic information comprises device identifiers, and before the determining a first response device in the at least one target device based on the semantic information, the method comprises:
   determining the target device corresponding to a device identifier received first as a first parsing device, and determining a target device except the first parsing device as a second parsing device; and
   sending, to the second parsing device, a control instruction for instructing to terminate semantic recognition of the voice instruction, so that the second parsing device that receives the control instruction terminates the semantic recognition of the voice instruction.

7. The method according to claim 1, wherein the first response instruction includes semantic information corresponding to the voice instruction of the user.

8. A non-transitory computer readable storage medium, wherein the storage medium stores a computer program, and the computer program is used for implementing a voice interaction method,
   wherein the method comprises:
   receiving a wakeup signal sent by at least one wakeup device in a plurality of electronic devices, wherein the wakeup signal is sent after the wakeup device collects a voice instruction of a user;
   in response to the wakeup signal, determining at least one target device from the plurality of electronic devices, wherein the at least one target device is located within a preset space, and a wakeup voice corresponding to the at least one target device matches the voice instruction;
   in response to the wakeup signal, determining a second response device from the at least one target device, wherein the second response device is a target device that is configured to play a preset announcement;
   sending a second response instruction to the second response device to instruct the second response device to play the preset announcement;
   obtaining semantic information parsed by each target device;
   determining a first response device in the at least one target device based on the semantic information; and
   sending a first response instruction to the first response device, wherein the first response instruction is used to instruct the first response device to respond to the voice instruction.

9. The computer readable storage medium according to claim 8, wherein the in response to the wakeup signal, determining at least one target device from the plurality of electronic devices comprises:
   determining at least one electronic device that is in the plurality of electronic devices and that is connected to a decision center through a preset communication manner as the target device, wherein a communication range of the preset communication manner is within the preset space.

10. The computer readable storage medium according to claim 8, wherein the in response to the wakeup signal, determining at least one target device from the plurality of electronic devices comprises:

obtaining location information and a device identifier of at least one of the electronic devices associated with a target user account; and determining at least one target device based on the location information and the device identifier of the electronic device, wherein the at least one target device is located within the preset space.

11. The computer readable storage medium according to claim 8, wherein the wakeup signal comprises device identifiers, and the in response to the wakeup signal, determining a second response device comprises:

determining the wakeup device corresponding to a device identifier received first as the second response device.

12. The computer readable storage medium according to claim 8, wherein the in response to the wakeup signal, determining a second response device comprises:

obtaining an image frame sequence comprising the user;

determining behavior information of the user based on the image frame sequence; and determining the second response device based on the behavior information of the user.

13. The computer readable storage medium according to claim 8, wherein the semantic information comprises device identifiers, and before the determining a first response device in the at least one target devices based on the semantic information, the method comprises:

determining the target device corresponding to a device identifier received first as a first parsing device, and determining a target device except the first parsing device as a second parsing device; and sending, to the second parsing device, a control instruction for instructing to terminate semantic recognition of the voice instruction, so that the second parsing device that receives the control instruction terminates the semantic recognition of the voice instruction.

14. An electronic device, wherein the electronic device comprises:

a processor; and a memory, configured to store processor-executable instructions, wherein the processor is configured to read the executable instructions from the memory, and execute the instructions to implement a voice interaction method, wherein the method comprises:

receiving a wakeup signal sent by at least one wakeup device in a plurality of electronic devices, wherein the wakeup signal is sent after the wakeup device collects a voice instruction of a user;

in response to the wakeup signal, determining at least one target device from the plurality of electronic devices, wherein the at least one target device is located within a preset space, and a wakeup voice corresponding to the at least one target device matches the voice instruction;

in response to the wakeup signal, determining a second response device from the at least one target device, wherein the second response device is a target device that is configured to play a preset announcement;

sending a second response instruction to the second response device to instruct the second response device to play the preset announcement;

obtaining semantic information parsed by each target device;

determining a first response device in the at least one target device based on the semantic information; and sending a first response instruction to the first response device, wherein the first response instruction is used to instruct the first response device to respond to the voice instruction.

* * * * *